(12) United States Patent
Tarraf et al.

(10) Patent No.: US 8,902,739 B2
(45) Date of Patent: Dec. 2, 2014

(54) BACKHAUL CONGESTION CONTROL FOR WIRELESS COMMUNICATION NETWORKS

(75) Inventors: Ahmed Tarraf, Bayonne, NJ (US); Xin Wang, Parsippany, NJ (US); Yang Yang, Parsippany, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 3019 days.

(21) Appl. No.: 11/138,251

(22) Filed: May 26, 2005

(65) Prior Publication Data

US 2006/0268689 A1    Nov. 30, 2006

(51) Int. Cl.
*H04L 12/26* (2006.01)
*H04W 28/14* (2009.01)
*H04L 12/835* (2013.01)
*H04L 12/807* (2013.01)
*H04L 12/801* (2013.01)
*H04W 92/12* (2009.01)

(52) U.S. Cl.
CPC ............... *H04L 47/10* (2013.01); *H04W 92/12* (2013.01); *H04W 28/14* (2013.01); *H04L 47/30* (2013.01); *H04L 47/27* (2013.01)
USPC .......................................... 370/229; 370/252

(58) Field of Classification Search
CPC .................................................. H04W 28/0278
USPC .......................................................... 370/229
See application file for complete search history.

(56) References Cited

U.S. PATENT DOCUMENTS

| | | | |
|---|---|---|---|
| 6,088,359 A * | 7/2000 | Wicklund et al. .......... | 370/236.1 |
| 6,894,974 B1 * | 5/2005 | Aweva et al. ............... | 370/230.1 |
| 2003/0139145 A1 * | 7/2003 | Lee et al. ........................ | 455/69 |
| 2004/0010585 A1 * | 1/2004 | Jones et al. ................... | 709/224 |
| 2005/0286416 A1 * | 12/2005 | Shimonishi et al. .......... | 370/229 |
| 2006/0126509 A1 * | 6/2006 | Abi-Nassif et al. ........... | 370/235 |
| 2006/0251004 A1 * | 11/2006 | Zhong et al. .................. | 370/318 |
| 2007/0091799 A1 * | 4/2007 | Wiemann et al. ............. | 370/230 |

* cited by examiner

*Primary Examiner* — Omar Ghowrwal
(74) *Attorney, Agent, or Firm* — Carlson, Gaskey & Olds

(57) ABSTRACT

A wireless communication system (20) includes backhaul congestion control. Whenever congestion is detected on the backhaul, a flow control message sets a window size to a reduced window size to reduce or eliminate packet drops and to facilitate alleviating the congestion condition. A disclosed example includes detecting backhaul congestion and responsively reducing an available backhaul receiver buffer space factor used for setting the window size for a subsequent backhaul transmission. In a disclosed example, the buffer space factor is gradually increased back toward an actual available buffer space as the congestion status improves.

8 Claims, 2 Drawing Sheets

BACKHAUL CONGESTION CONTROL FOR WIRELESS COMMUNICATION NETWORKS

FIELD OF THE INVENTION

This invention generally relates to telecommunications. More particularly, this invention relates to wireless communication systems.

DESCRIPTION OF THE RELATED ART

Wireless communication systems are in widespread use. Typical arrangements provide wireless communication capabilities to mobile stations such as cell phones within particular geographic regions. The areas of coverage are typically divided into cells that are each served by at least one base station transceiver. A wireless link between a mobile station and the base station transceiver provides the mobile station with access to the wireless communication network.

The base station transceiver communicates with one or more portions of the wireless network over a backhaul link or connection. Typical arrangements include a backhaul connection between a base station transceiver and a radio network controller. The base station transceiver and the radio network controller are the endpoints of the backhaul connection. In the downlink direction, the radio network controller is the backhaul transmitter and the base station transceiver is the backhaul receiver. In the uplink direction, the base station transceiver is the transmitter and the radio network controller is the receiver. In many instances, there is at least one router between a base station and the radio network controller. Many such backhaul links include T1 or E1 communication lines.

The routers aggregate or distribute traffic between the base station transceivers and the radio network controller. Typical router and backhaul link facility designs include the possibility for the backhaul link to become a bottleneck hindering the overall system throughput. When there is a large amount of backhaul communication, for example, there may be congestion on the backhaul link that does not allow for efficient communication in at least one of the uplink direction or the downlink direction between the radio network controller and the base station transceiver.

Backhaul network congestion is typically described as the situation where the amount of backhaul traffic in the downlink direction results in data packets being buffered at the output interface on the router or the radio network controller facing the base station transceiver, or in the uplink direction where the packets will be buffered at the output interface on the base station transceiver or the router facing the radio network controller. There is a point where the aforementioned buffer or buffers may overflow resulting in dropped packets. This condition is typically called backhaul network congestion. The packet drops during backhaul network congestion have a significant impact on user application performance and the overall system performance. Backhaul network congestion has been observed in a variety of arrangements including the commercial 1xEV-DO network.

Another issue with existing systems is that the continued attempted communications on the backhaul link tend to create a backhaul congestion problem that is not easily resolved. For example, when a router buffer is full because of backhaul congestion in the downlink direction, and a radio network controller continues to send the same amount of data in subsequent transmissions, it is difficult for the router buffer to be freed up and the congestion continues over time.

Backhaul communication typically uses UDP rather than TCP protocol. On top of the UDP protocol, application software provides a flow control mechanism that is intended to ensure that the backhaul transmitter will not overrun the receiver's buffer. This is typically achieved by a message from the backhaul receiver to the backhaul transmitter indicating the last packet that was received and the available buffer space or window size in the receiver buffer beyond that packet. For example, the backhaul receiver buffer can be per-flow, or per-user, or shared by all flows/users served by the base station transceiver. Depending on the receiver buffer arrangements, the flow control techniques work correspondingly on per-flow or per-user or per-base station basis. The flow control message is sent by the backhaul receiver to the backhaul transmitter every time a certain amount of packets is drained from the receiver buffer or upon expiration of a timer. Typical receiver buffers are designed so that they are large enough to provide sufficient backlog for efficient use of radio frequency resources or other network resources. Such flow control mechanisms do not have the ability to respond dynamically to changing traffic conditions on the backhaul. The backhaul transmitter repeatedly attempts to fill the entire receiver buffer, regardless of backhaul congestion status. This makes it difficult to resolve backhaul congestion.

There is a need for an arrangement that can avoid backhaul congestion or at least react to congestion conditions in a manner that allows the congestion to be relieved.

SUMMARY OF THE INVENTION

This invention addresses the need for improving backhaul performance by avoiding congestion or minimizing the effects of congestion when it occurs. A disclosed example embodiment provides for responding to backhaul congestion conditions by changing the amount of attempted communication along the backhaul link. In other words, with an example implementation of this invention, backhaul traffic is controlled in a manner that is responsive to congestion conditions to immediately address and eliminate the congestion or to facilitate resolving it quickly.

An exemplary disclosed method of communicating includes modifying an available backhaul receiver buffer space factor used for setting a backhaul receiver window size for a subsequent backhaul transmission responsive to a determined backhaul congestion condition.

In one example, the method includes gradually adjusting the available backhaul receiver buffer space factor from a current size.

In one example, when a backhaul congestion condition exists, the available backhaul receiver buffer space factor is decreased. In the same example, if the backhaul condition does not exist, the available buffer space factor is increased. In one example, the amount of increase occurs gradually over time, which facilitates maintaining backhaul conditions that avoid congestion.

The various features and advantages of this invention will become apparent to those skilled in the art from the following detailed description. The drawings that accompany the detailed description can be briefly described as follows.

DETAILED DESCRIPTION

This invention provides a backhaul congestion control technique that minimizes or avoids backhaul congestion. A disclosed example includes adjusting an available buffer space factor used for window size for subsequent backhaul communications responsive to current backhaul traffic or congestion conditions. The disclosed example includes the ability to increase or decrease the available buffer space factor based upon the current congestion conditions. By responsively controlling the available buffer space factor to accommodate current traffic conditions, the disclosed example facilitates more efficient backhaul communications and eliminates or minimizes backhaul congestion.

Figure 1:
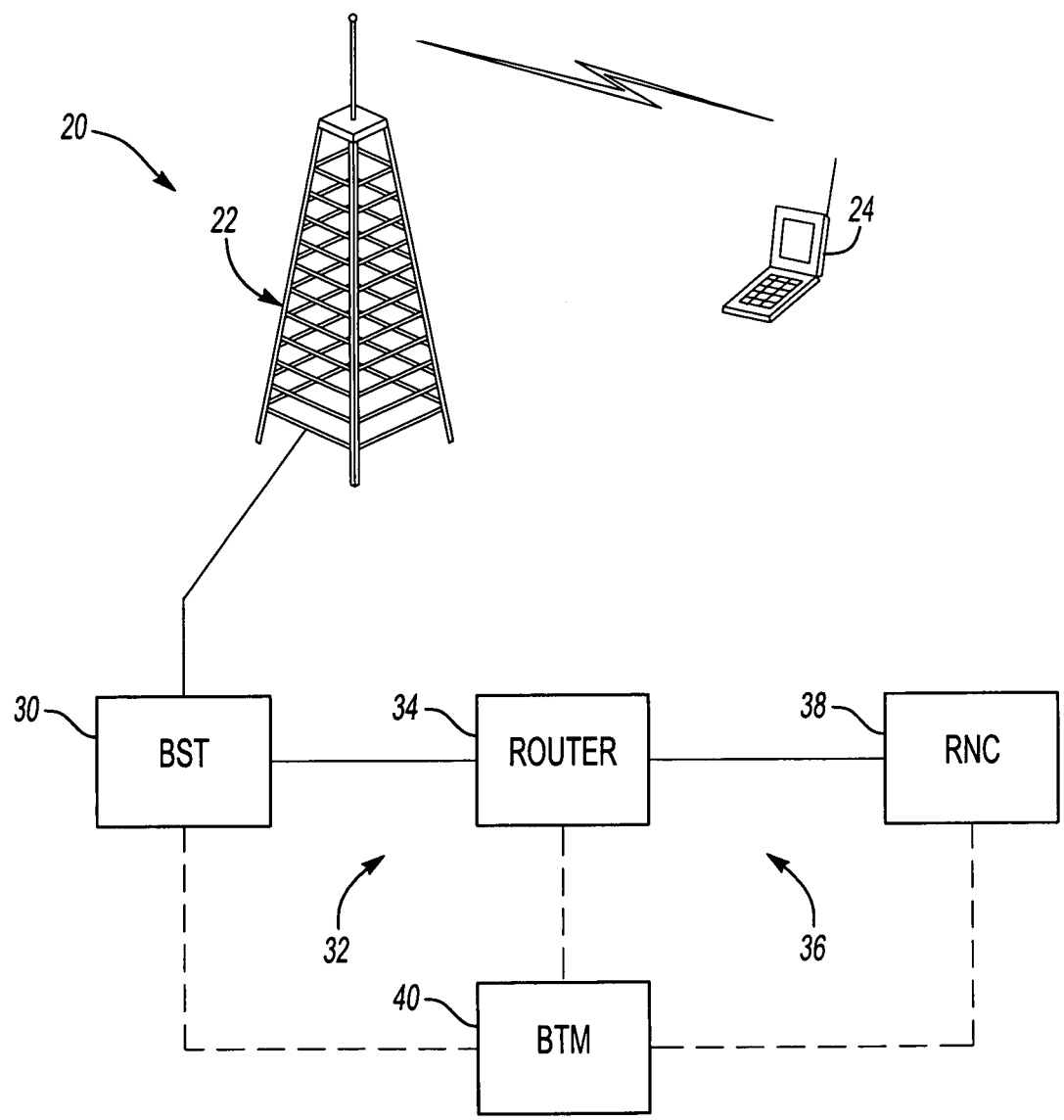
FIG. 1 schematically shows selected portions of a wireless communication system designed according to an embodiment of this invention.

FIG. 1 schematically shows selected portions of a wireless communication system 20. A base station radio tower 22 uses an over-the-air interface for communications with one or more mobile stations 24. The base station radio tower 22 operates in a known manner in conjunction with a base station transceiver (BST) 30. A backhaul link 32 connects the BST 30 with a router 34. Another backhaul connection 36 connects the router 34 to a radio network controller (RNC) 38. The connections 32 and 36 and the router 34 are part of the backhaul between the BST 30 and the RNC 38. Communications along the backhaul occur generally in a known manner. There are situations, however, when the backhaul may become congested, which would compromise operation of the system.

The illustrated example includes a backhaul traffic monitor (BTM) 40 that monitors the amount of traffic on the backhaul between the BST 30 and the RNC 38. In this particular example, the BTM 40 determines backhaul traffic conditions based upon one or more factors.

In one example, the BTM 40 uses an explicit congestion notification at the router 34. There are several known routers that support the capability of providing an explicit congestion notification. In such examples, the router 34 detects congestion before the queue of the router overflows and provides an indication of that congestion to other portions of the system such as the BTM 40, the BST 30, the RNC 38 or a combination of them. In some examples, a selected threshold is set at the router 34 that is lower than a packet drop threshold. When the average queue size exceeds the selected threshold, the router marks an Internet protocol (IP) packet with a "congestion experienced" code point, which is considered an explicit congestion notification. The BTM 40 uses that in one example to determine that there is a congestion condition on the backhaul.

Another technique includes the BTM 40 detecting when there are packet drops. Packet drops on the backhaul typically indicate congestion. In one example, the BTM 40 monitors packet or frame id's transmitted on the backhaul such that when received packets are reordered and there are missing packet id's, the BTM 40 determines that there has been at least one packet drop and utilizes that as an indication of congestion on the backhaul.

Another example includes the BTM 40 monitoring T1 utilization on the connection 32 or 36, for example. In one example, when the BTM 40 detects relatively long periods of full T1 utilization, that is determined to be an indication of congestion at the router 34.

The BTM 40 facilitates controlling traffic on the backhaul to minimize or avoid congestion. Assuming at least one of the factors mentioned above indicates that there is congestion on the backhaul, the BTM 40 facilitates altering the traffic flow on the backhaul to alleviate the congestion condition. Assuming that the congestion condition is occurring at the router 34, the BTM generates a flow control message to the BST 30, the RNC 38 or both instructing them to reduce the window size used for a subsequent transmission so that the backhaul transmitter (i.e., the BST 30 or the RNC 38) will reduce the load offered to the router 30 in the subsequent transmission. In one example, rather than reporting the actual available buffer space at the receiver, the BTM modifies an available backhaul receiver buffer space factor used for setting the window size. By reducing the available backhaul receiver buffer space factor responsive to determining that there is a congestion condition, the disclosed example allows the router 34 to process additional transmitted packets without becoming backed up, without having a repeatedly completely full buffer and without dropping any packets. Moreover, responding to a detected backhaul congestion condition by altering the available buffer space factor for setting the window size of a subsequent transmission allows for more quickly resolving the congestion condition.

Once the BTM 40 determines that the congestion condition no longer exists, the flow control messages from the receiver to the transmitter (or transmitters) indicate that the window size may now be increased for subsequent transmissions. In one example, increasing the available buffer space factor occurs gradually over time to eventually return to setting the window size on the backhaul based on an actual maximum available buffer space. Gradually increasing the available buffer space factor for setting the window size allows for reacting to changing traffic conditions on the backhaul. For example, a congestion condition may exist at one level and apparently be resolved shortly thereafter. If the buffer space factor used for setting the window size were increased too significantly, too rapidly, that may reintroduce a congestion condition under some circumstances. The disclosed example includes gradually increasing the available buffer space factor to accommodate such circumstances and to avoid over-increasing the window size too rapidly, which might reintroduce congestion. One example includes continuously monitoring the traffic on the backhaul using the BTM 40 and continuously adjusting the available buffer space factor used for setting window size up or down, depending on the current backhaul traffic volume.

Figure 2:
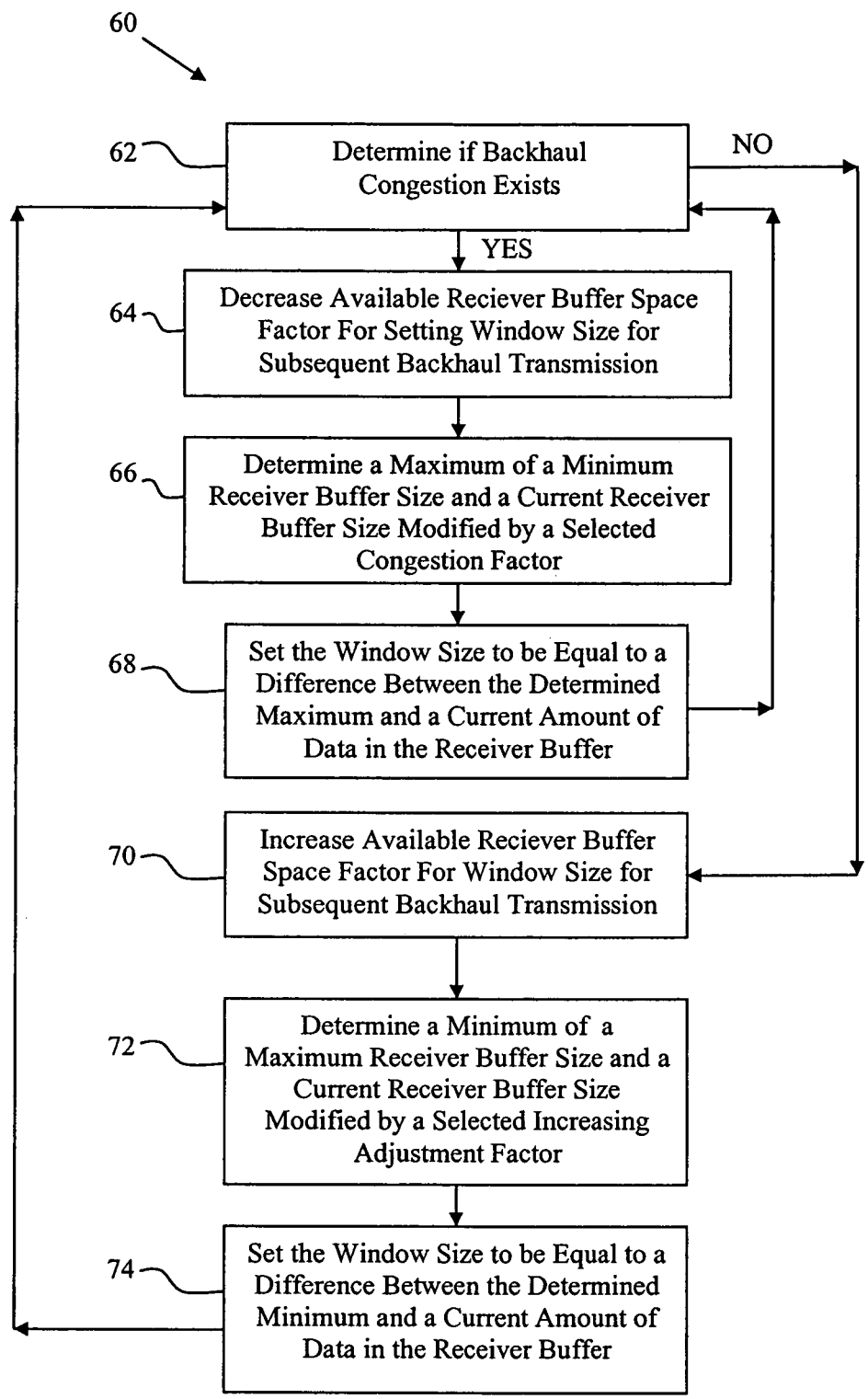
FIG. 2 is a flowchart diagram summarizing one example approach to control backhaul congestion.

The flowchart diagram 60 in FIG. 2 summarizes one example approach. In this example the BTM 40 determines if a backhaul congestion condition exists at 62. If there is congestion, the window size for subsequent backhaul transmissions will be based on an available buffer space factor that is decreased compared to an actual amount of available space in the buffer at 64. This example includes decreasing the available buffer space factor by first determining a maximum of a minimum receiver buffer size on the one hand and a current actual receiver buffer size modified by a selected congestion factor on the other hand. At 68, the window size is set to be equal to a difference between the maximum value determined at 66 and a current amount of data in the receiver buffer. In other words, instead of simply setting the window size to the difference between the buffer size and the current buffer load, this example uses a decreased available buffer space factor for setting the window side. This allows for some "reserve" to accumulate in the buffer to facilitate alleviating congestion on the backhaul.

One example includes using the following variables:
max_rcv_buf=400;
min_rcv_buf=50;
ini_rcv_buf=200;
congestion_factor=0.5;
buf_rampup=10

In this example, the available buffer space factor used for setting the window size for backhaul transmissions is initialized to the ini_rcv_buf value. When the BTM 40 detects congestion at the time a flow control message is to be sent, the determination made at 66 in this example uses the following relationship:

$$cur\_rcv\_buf = \max(cur\_rcv\_buf * congestion\_factor, min\_rcv\_buf)$$

This sets the available buffer space factor to the maximum of the minimum possible buffer space factor (i.e., min_rcv_buf) or the current available buffer space factor (i.e., cur_rcv_buf) modified by the congestion factor, which decreases the available buffer space factor to a lower value (i.e., 50% in this example).

Then, the window size is set at 68 using the following relationship:

$$window\_size = cur\_rcv\_buf - (\text{Last frame ID received} - \text{Last frame ID sent})$$

As shown in FIG. 2, when the BTM 40 determines that there is no congestion, the BTM proceeds at 70 to increase the available buffer space factor used for setting the window size for a subsequent backhaul transmission. The process continues at 72 including determining a minimum of a maximum receiver buffer size on the one hand and a current available receiver buffer space factor modified by a selected increasing adjusting factor on the other hand. In one example, this determination is made using the following relationship:

$$cur\_rcv\_buf = \min(cur\_rcv\_buf + buf\_rampup, max\_rcv\_buf)$$

Then, the window size is set at 74 based upon a difference between the determined minimum at 72 and the current amount of data in the receiver buffer. One example includes using the following relationship:

$$window\_size = cur\_rcv\_buffer - (\text{Last frame ID received} - \text{Last frame ID sent})$$

The disclosed example provides improved backhaul congestion control. Known systems have some flow control but cannot avoid congestion and become very inefficient resulting in degraded performance whenever there is congestion. The disclosed example includes the recognition that it is inefficient for a receiver to continue to request or receive the same amount of data under congestion conditions as under more favorable traffic conditions. The disclosed example reduces the amount of data requested during congestion conditions by decreasing the available buffer space factor used for setting a window size for a subsequent transmission. This helps avoid or minimize buffer overflow at the congested backhaul node. The disclosed example allows for a quicker recovery from congestion, prevents or reduces packet drops, has no negative impact on radio frequency utilization and improves end user and overall network performance.

The BTM 40 is schematically shown as a separate element in FIG. 1 for discussion purposes. The functions of the example BTM 40 may be realized using hardware, software or a combination of them. A BTM 40 may be realized within one or more of the existing components of the wireless communication system or may be a separate, dedicated component. Those skilled in the art who have the benefit of this description will realize how to arrange components and programming to meet the needs of their particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
   modifying an available backhaul receiver buffer space factor responsive to a determined backhaul traffic condition;
   setting a backhaul window size for a subsequent backhaul transmission using the modified receiver buffer space factor; and
   determining whether the determined backhaul traffic condition corresponds to backhaul congestion and reducing the available backhaul receiver buffer space factor relative to an actual buffer space if there is backhaul congestion.

2. A method of communicating, comprising:
   modifying an available backhaul receiver buffer space factor responsive to a determined backhaul traffic condition;
   setting a backhaul window size for a subsequent backhaul transmission using the modified receiver buffer space factor; and
   determining whether the backhaul traffic condition is indicative of backhaul congestion;
   decreasing the backhaul receiver buffer space factor if there is backhaul congestion; and
   increasing the backhaul receiver buffer space factor if the backhaul traffic condition is not indicative of backhaul congestion and the current receiver buffer space factor is less than a maximum available receiver buffer space.

3. The method of claim 2, wherein decreasing the backhaul receiver buffer space factor comprises:
   determining a maximum of a minimum receiver buffer space factor and a current receiver buffer space factor modified by a selected congestion factor; and
   setting the window size to be equal to a difference between the determined maximum and a current amount of data in the receiver buffer.

4. The method of claim 2, wherein increasing the backhaul window size comprises
   determining a minimum of a maximum receiver buffer space factor and a current receiver buffer space factor modified by a selected increasing adjustment factor; and
   setting the window size to be equal to a difference between the determined minimum and a current amount of data in the receiver buffer.

5. A method of communicating, comprising:
   modifying an available backhaul receiver buffer space factor responsive to a determined backhaul traffic condition;
   setting a backhaul window size for a subsequent backhaul transmission using the modified receiver buffer space factor; and
   increasing the available backhaul receiver buffer space factor from a first size corresponding to a first backhaul traffic condition to a second, larger size corresponding to a second backhaul traffic condition indicating that the backhaul is relatively less congested than the first traffic condition.

6. The method of claim 5, comprising selecting an adjustment factor for increasing the size from a current size and adding the adjustment factor to the first size to obtain the second size.

7. The method of claim 6, comprising repeatedly adding the adjustment factor to gradually increase the size until the size corresponds to a maximum available buffer size or a desired size corresponding to a current backhaul traffic condition.

8. A method of communicating, comprising;
modifying an available backhaul receiver buffer space factor responsive to a determined backhaul traffic condition;
setting a backhaul window size for a subsequent backhaul transmission using the modified receiver buffer space factor; and
decreasing the available backhaul receiver buffer space factor from a first size corresponding to a first backhaul traffic condition to a second, smaller size corresponding to a second backhaul traffic condition indicating that the backhaul is relatively more congested than the first traffic condition.

\* \* \* \* \*